United States Patent [19]
Engelstad et al.

[11] Patent Number: 5,286,233
[45] Date of Patent: Feb. 15, 1994

[54] ELECTRIC CONTROL OF A HARVESTER FAN

[76] Inventors: Jonathan L. Engelstad, 728 SE. Richland Ct., Ankeny, Iowa 50021; Ted R. Myers, 306 E. Monroe, Pleasantville, Iowa 50225

[21] Appl. No.: 21,701

[22] Filed: Feb. 24, 1993

[51] Int. Cl.⁵ ............................................. F16H 7/00
[52] U.S. Cl. .................................................... 474/101
[58] Field of Search .................... 474/101, 109–110, 474/111, 113, 117, 133–138

[56] References Cited

U.S. PATENT DOCUMENTS

| | | | |
|---|---|---|---|
| 4,094,205 | 6/1978 | Cook | 474/110 X |
| 4,324,552 | 4/1982 | Boushek et al. | 474/133 X |
| 5,176,581 | 1/1993 | Kumm | 474/110 X |

Primary Examiner—Thuy M. Bui

[57] ABSTRACT

The air system on a harvester includes a fan with a remotely actuatable belt tightener assembly controlled by an electric acme thread actuator. A control circuit connected to the actuator includes a fan control switch and an engine speed switch for preventing fan actuation above a preselected engine speed. The actuator retains the belt tightener in the engaged position when the engine is switched off so that belt inspection and tension adjustments can be made easily. The tightener assembly includes simple tension indicating and adjusting structure for providing easy and accurate belt adjustments when the engine is off.

19 Claims, 3 Drawing Sheets

ELECTRIC CONTROL OF A HARVESTER FAN

BACKGROUND OF THE INVENTION

1) Field of the Invention

The present invention relates generally to harvesters such as cotton pickers and strippers, and more specifically to a fan control for engaging and disengaging a fan on such a harvester.

2) Related Art

Cotton pickers and strippers usually include a relatively large belt-driven fan. The fan, which is engaged by activation of a belt tightener assembly including a lever in the harvester cab which is connected through mechanical linkages to an idler, supplies a relatively large volume of air to numerous air jets on the cotton conveying ducts.

Several problems exist with presently available fan activation systems. The mechanical linkages are cumbersome, difficult to install and access for maintenance, and often need adjustment. Hydraulically operated belt tightener assemblies require engine power for engagement, and therefore belt inspection and idler adjustment in the operational position can only be carried out with the engine running. If the fan is engaged at a high engine speed, the belt is subject to considerable tension and slippage upon start-up and other components are put under high acceleration loads.

BRIEF SUMMARY OF THE INVENTION

It is therefore an object of the present invention to provide an improved control for a harvester fan. It is another object to provide such a control which overcomes most or all of the aforementioned problems.

It is another object of the present invention to provide an improved control for a harvester fan which is simple to construct and install, and which is reliable in operation. It is a further object to provide such a control which facilitates smooth fan start-up, reduces acceleration loading, and prolongs fan belt life. It is still another object to provide such a control which permits belt inspection and easy belt tension adjustment in the operational position without need for the harvester engine to be running.

It is still a further object of the present invention to provide an improved control for a belt tightener on a harvester fan which facilitates reversal of the tightener at a position intermediate the engaged and disengaged positions. It is a further object to provide such a control wherein the selected condition is easily ascertainable from the position of an operator control switch.

The air system on a harvester includes a fan with a remotely actuatable belt tightener assembly controlled by an electric actuator. A control circuit connected to the actuator includes a continuous contact fan control switch and an engine speed switch for preventing fan actuation above a preselected engine speed to reduce fan belt and acceleration loads. The actuator retains the belt tightener in the engaged position when the engine is switched off so that belt inspection and tension adjustments can be made easily. The tightener assembly includes simple tension indicating and adjusting structure for providing easy and accurate belt adjustments when the engine is off. The assembly is compact and simple to install and adjust.

These and other objects, features and advantages of the present invention will become apparent to one skilled in the art upon reading the following detailed description in view of the drawings.

DETAILED DESCRIPTION OF THE DRAWINGS

Figure 1:
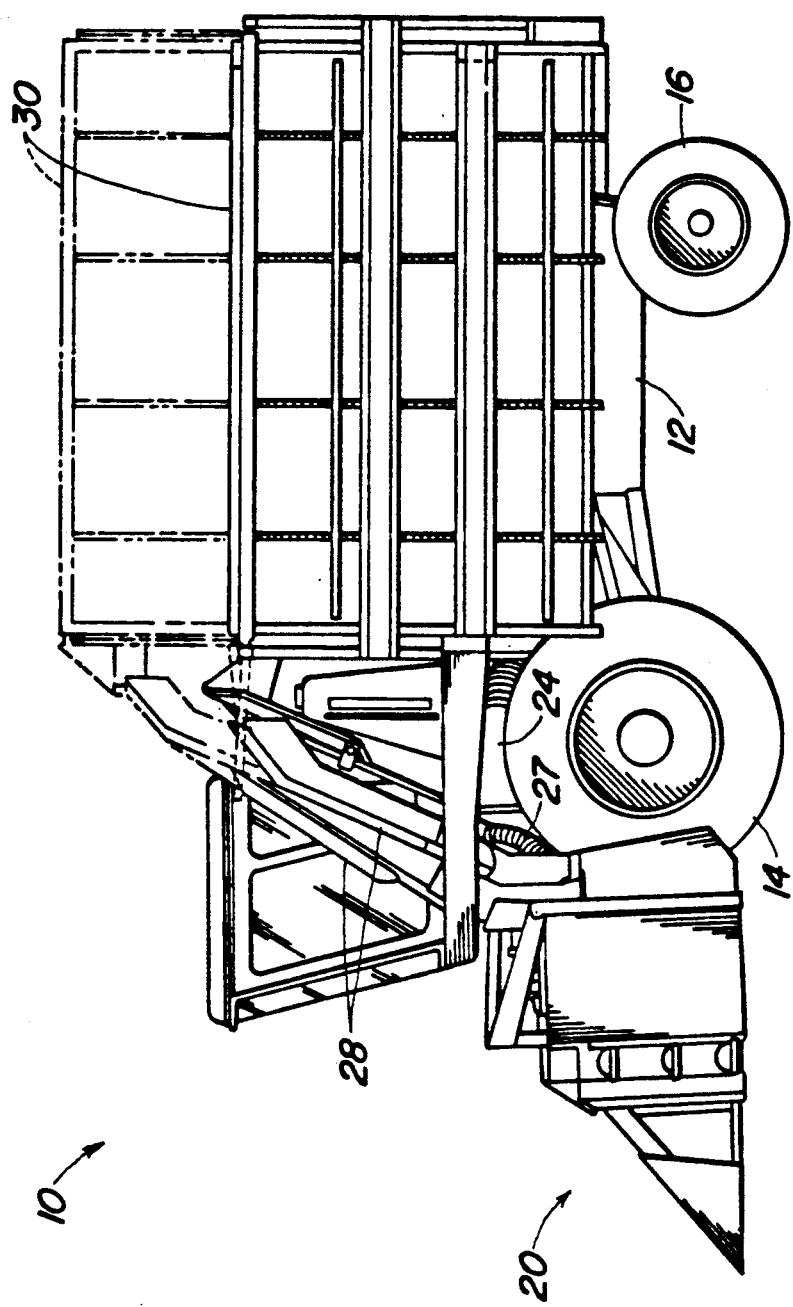
FIG. 1 is a side view of a harvester having a fan for providing air to a conveying system.

Referring now to FIG. 1, therein is shown a harvester 10 having a main frame 12 supported for movement over the ground by forward drive wheels 14 and rear steerable wheels 16. As shown, the harvester 10 is a cotton picker of the type which is available commercially as the John Deere Model 9960 Cotton Picker and includes forward row units 20 for removing cotton from rows of plants. An air system indicated generally at 24 includes a large fan (24F of FIG. 2) driven by the harvester engine 25 through a belt drive assembly 26. The air from the fan 24F is delivered through flexible conduits 27 to cotton-conveying ducts 28 extending upwardly and rearwardly from the row units 20 to a basket 30.

Figure 2:
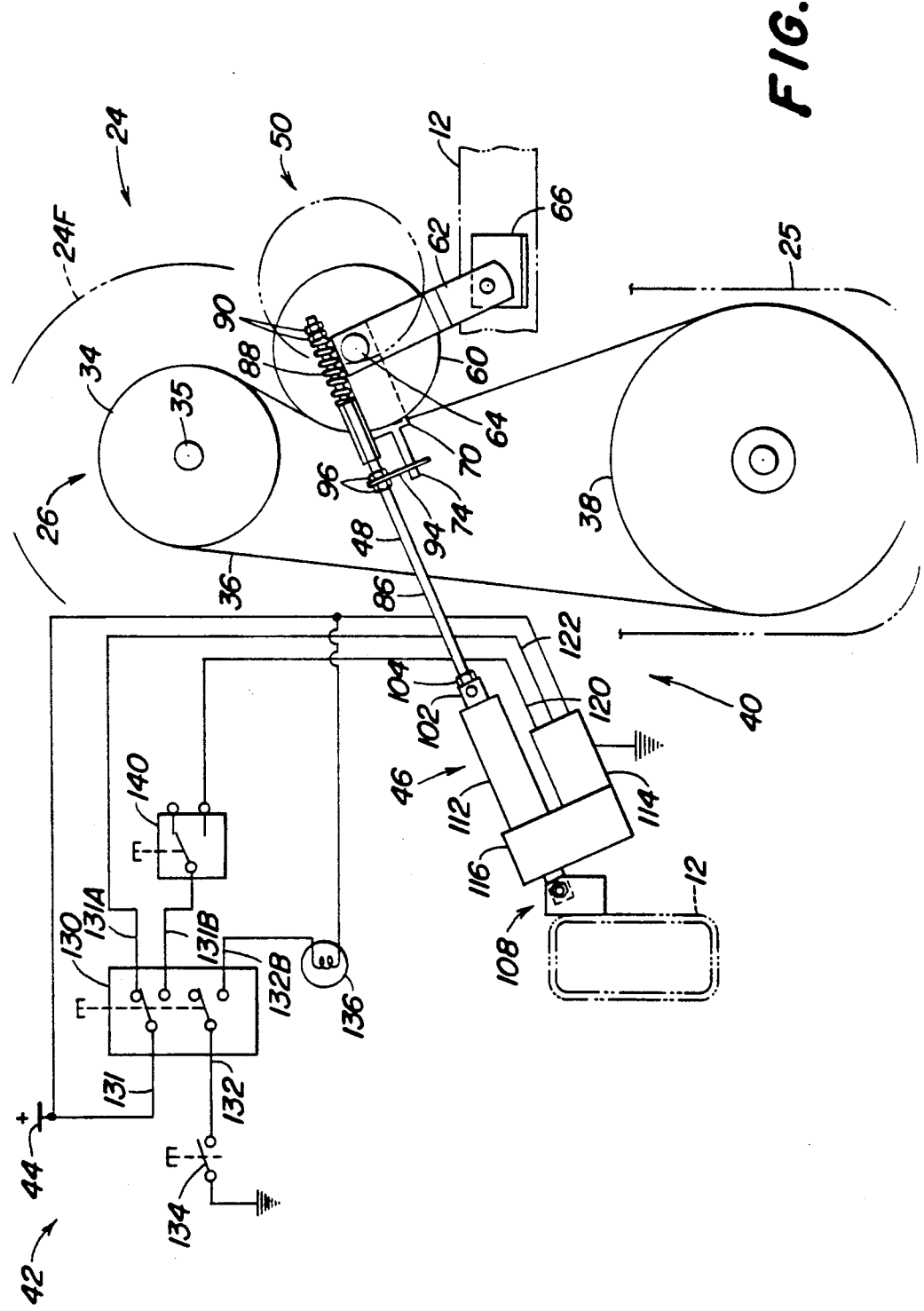
FIG. 2 is a side view of the belt tightener assembly with a schematic representation of the control for use with the harvester of FIG. 1.

As shown in FIG. 2, a pulley 34 is connected to the fan 24F for rotation with the fan about an axis 35. A belt 36 is trained around the pulley 34 and around an engine-driven pulley 38 which is aligned with and located below the pulley 34. A remotely actuatable belt tightener assembly 40 is movable between an engaged position (solid lines of FIG. 2) and a disengaged position (broken lines). An electric control circuit 42 is connected between the electrical power source 44 on the harvester 10 and a belt tightener actuator 46. The actuator 46 is connected through a linkage 48 to an idler assembly 50 pivotally connected to the frame 12 adjacent the belt 36.

Figure 3:
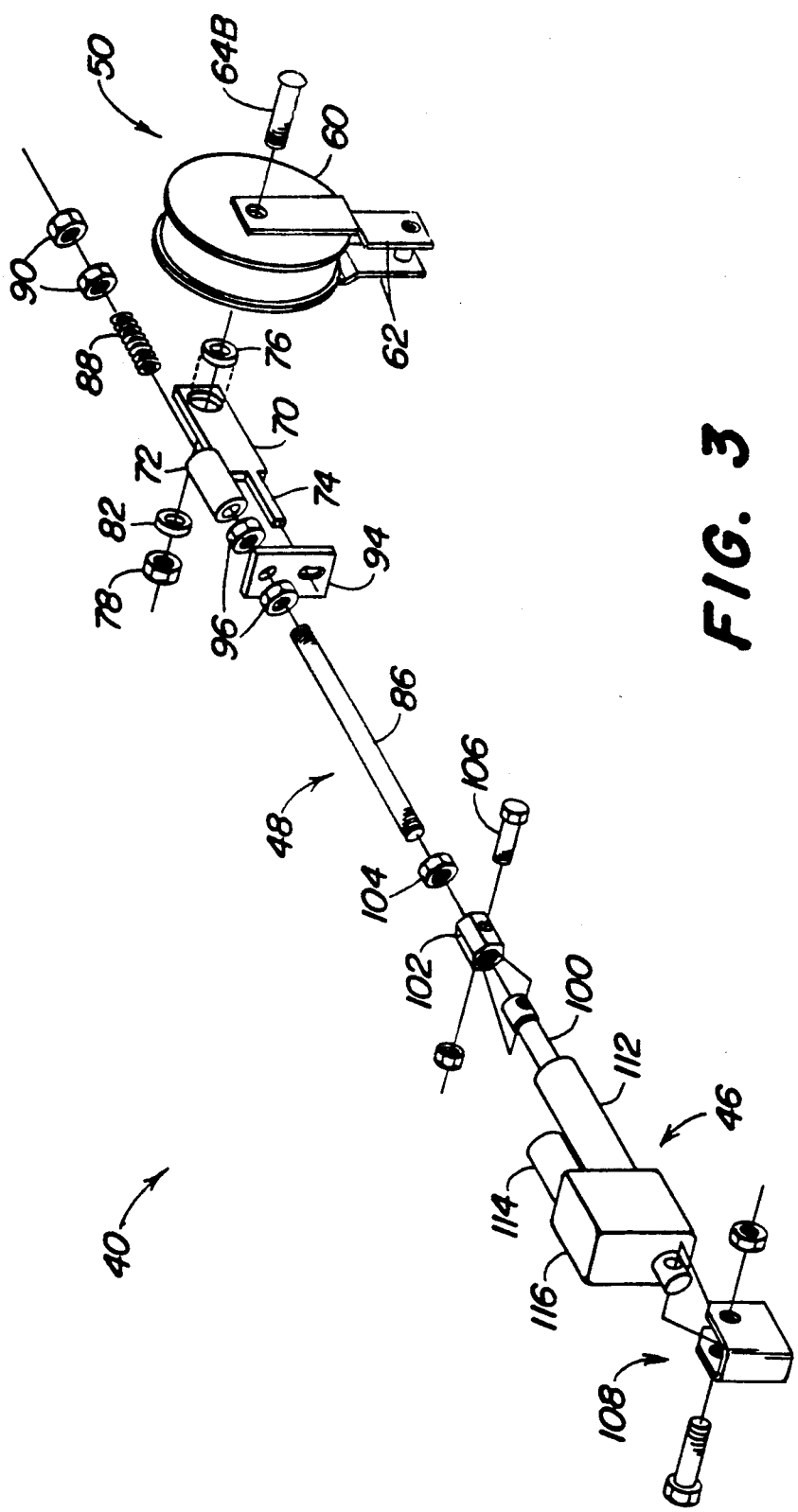
FIG. 3 is an exploded view of the belt tightener assembly of FIG. 2.

The idler assembly 50 includes an idler 60 rotatably mounted between a pair of upright idler arms 62 by a bolt and bushing assembly indicated generally at 64. The idler arms 62 are pivotally connected to a bracket 66 (FIG. 2) mounted on the frame 12 outwardly adjacent the belt 36 for rocking about an axis parallel to the axes of rotation of the pulleys 34 and 38. The bolt (64b of FIG. 3) extends through the pulley bushing and through an aperture in the aft end of a fan strap assembly 70 located on one side of the idler assembly 50. A rod-receiving cylindrical member 72 is welded to the upper forward edge of the assembly, and an indexing extension 74 projects forwardly from the assembly below the member 72. A spacer 76 extends from the inner idler arm 62 and through the aperture in strap assembly 70. A nut 78 is threaded on the end of the bolt 64b to sandwich the bushing 76 between the idler arm 62 and a washer 82.

The linkage 48 includes a threaded rod 86 having an end slidably received in and projecting through the cylindrical member 72. A compression spring 88 encircles the rod end and is captured between the aft end of the cylindrical member 72 and the end of the rod 86 by a pair of nuts 90. An apertured indexing strap 94 is secured to a threaded central portion of the rod 86 by a pair of nuts 96 with the lower aperture receiving the indexing extension 74 of the assembly 70 (FIG. 2) to prevent rotation of the rod 86 as the actuator 46 extends and retracts. The other end of the threaded rod 86 is connected to extending and retracting member 100 of the actuator 46 by a clevis 102 threaded onto the rod end and locked in position thereon by a locking nut 104. The clevis 102 is pinned to the member 100 by a screw and nut assembly 106. The base end of the actuator 46 is pivotally connected to the frame 12 by a bracket assembly 108.

The actuator 46 includes a motor 112 connected to an overload protection circuit 114, both of which are mounted on a connection base 116. The circuit 114 is connected to the positive and negative terminals of the power source 44 and to a pair of input control terminals 120 and 122. When the terminal 122 is connected to the positive terminal, the motor 112 rotates a first direction to extend the member 100 thereby moving the nut 96 against the member 72 to shift the idler assembly 50 to the disengaged position (broken lines of FIG. 2). When the terminal 120 is connected to the positive terminal, the motor rotates the opposite direction to retract the member 100 and move the idler to the engaged position (solid lines of FIG. 2). The circuit 114 senses a looked rotor condition of the motor 112 to turn off the actuator motor until the opposite one of the terminals 120 and 122 is energized, thereby eliminating need for a slip clutch on the actuator and providing overload protection. The circuit 114 also permits use of a continuous contact fan actuator switch (switch 130 described directly below), rather than a momentary switch, so that the operator has a clear indication from the switch position as to whether the fan engaged or fan disengaged position has been selected.

The electric control circuit 42 (FIG. 2) includes a ganged single pole, double throw fan actuator switch 130 having a first input terminal 131 with corresponding output terminals 131a and 131b. The input terminal 131 is connected to the positive terminal of the source 44. A second input terminal 132 is connected to a low fan speed switch 134 which, in turn, is connected to ground. An output terminal 132b is connected to the positive terminal of the source 44 through an indicator light 136. The switch 134 closes when fan speed decreases below a preselected minimum speed to connect the second terminal 132 to ground and illuminate the light 136 provided the fan switch 130 is in the on (down) position.

The output terminal 131a of the fan actuator switch 130 is connected to the extend terminal 122 of the circuit 114. The output terminal 131b is connected through a slow idle switch 140 to the retract terminal 120 of the circuit 114. The switch 140 closes to permit the fan 24 can be actuated only if the engine speed is below a preselected minimum speed assuring that acceleration and fan belt loads will be minimized upon fan start-up.

The actuator 46 preferably is of the type which is known as the Electrak 2 Acme Thread Actuator and the protection circuit is an ELS-200, both commercially available from Warner Electric. The motor on the actuator 46 can be reversed in the middle of the stroke by reversing the position of the switch 130. The actuator 46 retains its present position when power is interrupted to the control circuit. When the engine is turned off with the belt tightener assembly 40 in the engaged position (solid lines of FIG.2), the assembly 40 remains in the belt-tightening position to facilitate inspection and access for belt tension adjustments.

To adjust belt tension, the rear nut 90 (outer or right-hand nut as viewed in FIG. 2) on the linkage 48 is loosened on the rod 86, and the inner nut 90 is threaded to the position wherein the spring 88 is compressed such that the rear extremity of the spring 88 aligns with the back edge of the strap assembly 70. The outer nut 90 is then tightened against the inner nut to maintain the adjusted tension.

In operation assuming initially that the fan 24F is disengaged, the engine 25 is first throttled down to a slow idle speed so that the switch 140 closes. The operator then moves the fan switch 130 to the engaged position (down) to energize the terminal 120 and retract the member 100 and rod 86. The spring 88 urges the idler 60 into engagement with the back side of the belt 36 to engage the fan. When the actuator motor stalls, the circuit 114 senses the increased motor current and turns off power to the actuator motor until the switch 130 is moved to the disengage (up) position to energize the terminal 122 and extend the member 100 and rod 86 to disengage fan drive. If fan speed drops too low while the fan switch 130 is turned on, the switch 134 will close and the indicator light 136 will warn the operator of the low fan speed condition.

Having described the preferred embodiment, it will become apparent that various modifications can be made without departing from the scope of the invention as defined in the accompanying claims.

We claim:

1. In a harvester having a frame, an engine having a running and a nonrunning state, a source of electric power, and a fan for providing a source of air for moving harvested crop material, a fan control comprising:
    a first pulley driven by the engine;
    a second pulley connected to the fan for driving the fan;
    a belt trained around the first and second pulleys;
    a belt tightener supported adjacent the belt and movable between a first position for relaxing the belt to disengage drive to the fan and a second position for tightening the belt to provide drive to the fan from the first pulley;
    an electric actuator selectively connectible to the source of electric power for moving the tightener between the first and second positions and retaining the position selected after power is disconnected from the actuator; and
    control means connected between the actuator and to the source of electric power on the harvester for moving the tightener to the second position.

2. The invention as set forth in claim 1 wherein the control means and actuator are operable to move the tightener to the second position when the engine is in the nonrunning state.

3. The invention as set forth in claim 1 wherein the control means includes means for preventing movement of the tightener to the second position when the engine is operating above a preselected speed.

4. The invention as set forth in claim 3 wherein the control means further includes means for providing an indication when the tightener is in the second position and the fan speed is below a preselected minimum speed.

5. The invention as set forth in claim 4 wherein the control means includes a fan actuator switch and the means for preventing movement of the tightener comprises an engine speed responsive switch connected to the fan actuator switch.

6. The invention as set forth in claim 5 wherein the actuator includes first and second control terminals, and the fan actuator switch and engine speed switch are connected in series with one of the terminals.

7. The invention as set forth in claim 6 wherein the fan actuator switch includes an output terminal connected directly to the other one of the control terminals.

8. The invention as set forth in claim 1 wherein the actuator comprises a linear actuator movable between first and second positions corresponding to the first and second positions of the belt tightener, wherein upon interruption of power to the actuator, the actuator retains the position it was in at the time of the power interruption.

9. The invention as set forth in claim 8 wherein the belt tightener includes tension adjusting means having a visual indicator for providing an indication of belt tension when the tightener is in the second position and the engine is in the nonrunning state.

10. In a harvester having a frame, an engine having a running and a nonrunning state, a source of electric power, and a fan for providing a source of air for moving harvested crop material, a fan control comprising:
a first pulley driven by the engine;
a second pulley connected to the fan for driving the fan;
a belt trained around the first and second pulleys;
an idler pulley supported adjacent the belt and movable between a first position for relaxing the belt to disengage drive to the fan and a second position for tightening the belt to provide drive to the fan from the first pulley;
an actuator for moving the idler between the first and second positions and retaining the idler in the second position when the engine is in the nonrunning state;
control means connected to the actuator for operating the actuator; and
tension adjusting means located between the actuator and the pulley and including a visual indicator for providing an indication of belt tension when the tightener is in the second position.

11. The invention as set forth in claim 10 wherein the actuator comprises a linear actuator connected to the source of electric power through the control means.

12. The invention as set forth in claim 10 wherein the tension adjusting means includes a compression spring encircling a threaded rod and a nut threaded onto the rod and accessible when the tightener is in the second position.

13. The invention as set forth in claim 12 including an anti-rotation device located on the rod for preventing rotation of the rod when the actuator is operated.

14. The invention as set forth in claim 10 including means pivotally connecting the actuator to the harvester frame, means pivotally connecting the idler to the harvester frame, and an adjustable linkage connected between the actuator and the idler.

15. The invention as set forth in claim 10 wherein the actuator comprises a motor-driven acme thread device.

16. The invention as set forth in claim 10 wherein the control means includes a two-position continuous contact switch, and an overload protection circuit connected between the actuator and the continuous contact switch.

17. The invention as set forth in claim 16 further comprising a slow idle switch connected between the continuous contact switch and the overload protection circuit for preventing movement of the actuator to the second position when the engine speed if above a preselected speed.

18. The invention as set forth in claim 17 further comprising a slow fan speed indicator connected to the continuous contact switch.

19. The invention as set forth in claim 16 wherein the control means facilitates reversal of the actuator when the pulley is in a position intermediate the first and second positions.

* * * * *